(12) United States Patent
Kim et al.

(10) Patent No.: US 10,873,795 B2
(45) Date of Patent: *Dec. 22, 2020

(54) RELAY SYSTEM IN RING TOPOLOGY

(71) Applicant: SOLID, INC., Seongnam-si (KR)

(72) Inventors: Do Yoon Kim, Bucheon-si (KR); Kwang Nam Seo, Uiwang-si (KR); Hee Gon Kim, Seoul (KR)

(73) Assignee: SOLiD. INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,971

(22) Filed: Dec. 28, 2016

(65) Prior Publication Data

US 2017/0111717 A1    Apr. 20, 2017

Related U.S. Application Data (63) Continuation of application No. 14/411,485, filed as application No. PCT/KR2014/007584 on Aug. 14, 2014, now Pat. No. 9,559,777.

(30) Foreign Application Priority Data

Dec. 4, 2013 (KR) .......................... 10-2013-0150081

(51) Int. Cl.
*H04B 10/03* (2013.01)
*H04Q 11/00* (2006.01)
(Continued)

(52) U.S. Cl.
CPC ......... *H04Q 11/0005* (2013.01); *H04B 10/25* (2013.01); *H04B 10/275* (2013.01);
(Continued)

(58) Field of Classification Search
CPC ........ H04Q 2011/0045; H04Q 11/0005; H04B 10/25; H04B 10/275; H04B 10/29;
(Continued)

(56) References Cited

U.S. PATENT DOCUMENTS

| | | | | |
|---|---|---|---|---|
| 5,278,824 A | * | 1/1994 | Kremer | H04J 3/085 370/223 |
| 5,717,796 A | * | 2/1998 | Clendening | H04J 14/0283 370/222 |

(Continued)

FOREIGN PATENT DOCUMENTS

| | | |
|---|---|---|
| KR | 20-0228565 Y1 | 4/2001 |
| KR | 10-2001-0066201 A | 7/2001 |

(Continued)

OTHER PUBLICATIONS

International Search Report for PCT/KR2014/007584.
Notice of Allowance issued in parent U.S. Appl. No. 14/411,485 dated Sep. 23, 2016.

*Primary Examiner* — Dibson J Sanchez
(74) *Attorney, Agent, or Firm* — Sughrue Mion, PLLC (57) ABSTRACT

A master unit configured to manage a plurality of remote units connected in a ring topology, the master unit comprising: a network management section configured to transmit at least one of a path-state monitoring control signal and a delay measurement control signal to the plurality of remote units in a first direction and a second direction which is a reverse direction of the first direction, and receives an acknowledgement signal in response to the at least one of a path-state monitoring control signal and a delay measurement control signal; and switching control means for transmitting a forward signal received from a base station in the first direction, and transmitting a switching control signal in the second direction when a defect is detected in any remote unit among the plurality of remote units by the network management section.

14 Claims, 5 Drawing Sheets

(51) Int. Cl.
*H04B 10/25* (2013.01)
*H04B 10/275* (2013.01)
*H04B 10/29* (2013.01)
*H04J 14/02* (2006.01)

(52) U.S. Cl.
CPC .............. *H04B 10/29* (2013.01); *H04B 10/03* (2013.01); *H04J 14/0283* (2013.01); *H04Q 2011/0045* (2013.01)

(58) Field of Classification Search
CPC .. H04B 10/03; H04B 10/038; H04B 10/2755; H04B 10/0771; H04J 14/0283
USPC .......................................... 398/1–8, 43–103
See application file for complete search history.

(56) References Cited

U.S. PATENT DOCUMENTS

| | | | | |
|---|---|---|---|---|
| 5,844,889 | A | 12/1998 | Takatsu | |
| 5,909,175 | A * | 6/1999 | Yamasaki | H04J 3/085 340/506 |
| 6,137,603 | A * | 10/2000 | Henmi | H04B 10/27 398/1 |
| 6,201,788 | B1 * | 3/2001 | Ishiwatari | H04J 3/08 370/228 |
| 6,307,652 | B1 * | 10/2001 | Fassih-Nia | H04B 10/27 398/4 |
| 6,307,986 | B1 * | 10/2001 | Duerksen | H04J 14/0212 385/24 |
| 6,351,582 | B1 * | 2/2002 | Dyke | H04B 10/272 385/24 |
| 6,400,476 | B1 * | 6/2002 | Arecco | H04J 14/0295 398/9 |
| 6,414,768 | B1 * | 7/2002 | Sakata | H04B 10/035 398/59 |
| 6,466,591 | B1 * | 10/2002 | See | H04J 3/085 370/535 |
| 6,473,397 | B1 * | 10/2002 | Au | H04L 12/5601 370/218 |
| 6,590,681 | B1 | 7/2003 | Egnell | |
| 6,614,754 | B1 * | 9/2003 | Usuba | H04J 3/085 370/222 |
| 6,657,952 | B1 * | 12/2003 | Shiragaki | H04J 14/0212 370/223 |
| 6,661,792 | B1 | 12/2003 | Park | |
| 6,879,558 | B1 | 4/2005 | Honda | |
| 7,065,040 | B2 * | 6/2006 | Nagamine | H04J 3/085 370/223 |
| 7,092,634 | B2 * | 8/2006 | Lee | H04J 14/0206 385/16 |
| 7,920,576 | B2 * | 4/2011 | Sakauchi | H04L 12/42 370/317 |
| 7,925,165 | B2 * | 4/2011 | Cavazzoni | H04J 14/0241 398/49 |
| 9,008,501 | B2 * | 4/2015 | Lutgen | H04J 14/0283 398/2 |
| 2002/0018616 | A1 * | 2/2002 | Li | H04J 14/0283 385/24 |
| 2002/0080440 | A1 | 6/2002 | Li | |
| 2002/0122228 | A1 * | 9/2002 | Rappaport | H04L 43/026 398/98 |
| 2003/0016699 | A1 * | 1/2003 | McClary | H04J 3/0602 370/474 |
| 2003/0026272 | A1 | 2/2003 | Nagamine | |
| 2003/0031126 | A1 * | 2/2003 | Mayweather | H04Q 11/0062 370/223 |
| 2003/0152027 | A1 * | 8/2003 | Takagi | H04J 3/085 370/222 |
| 2003/0180047 | A1 | 9/2003 | Way | |
| 2005/0031348 | A1 * | 2/2005 | Choi | H04J 14/0227 398/59 |
| 2005/0036444 | A1 * | 2/2005 | Park | H04J 14/0283 370/222 |
| 2005/0044272 | A1 * | 2/2005 | Uzun | H04L 12/42 709/245 |
| 2005/0063396 | A1 | 3/2005 | Yu | |
| 2006/0007854 | A1 * | 1/2006 | Yu | H04L 12/43 370/229 |
| 2006/0127100 | A1 * | 6/2006 | Frankel | H04B 10/29 398/158 |
| 2006/0171717 | A1 * | 8/2006 | Kikuchi | H04J 14/0294 398/83 |
| 2006/0210274 | A1 | 9/2006 | Lichtman | |
| 2006/0224659 | A1 * | 10/2006 | Yu | H04L 12/43 709/201 |
| 2006/0228112 | A1 | 10/2006 | Palacharla | |
| 2007/0025729 | A1 | 2/2007 | Barnard | |
| 2007/0036544 | A1 * | 2/2007 | Fukashiro | H04J 14/0227 398/19 |
| 2007/0086332 | A1 * | 4/2007 | Way | H04J 14/0232 370/223 |
| 2007/0133998 | A1 * | 6/2007 | Xia | H04B 10/40 398/155 |
| 2008/0089693 | A1 * | 4/2008 | El-Ahmadi | H04L 1/0057 398/135 |
| 2008/0298231 | A1 * | 12/2008 | Takakuwa | H04L 12/437 370/223 |
| 2008/0316918 | A1 * | 12/2008 | Sakauchi | H04L 12/437 370/223 |
| 2009/0074403 | A1 * | 3/2009 | Chi | H04B 10/275 398/3 |
| 2009/0141621 | A1 * | 6/2009 | Fan | H04L 45/021 370/223 |
| 2010/0296808 | A1 * | 11/2010 | Hinderthur | H04J 14/0294 398/5 |
| 2011/0064409 | A1 * | 3/2011 | Grobe | H04B 10/807 398/58 |
| 2011/0158086 | A1 * | 6/2011 | Sakauchi | H04L 12/42 370/225 |
| 2011/0188866 | A1 * | 8/2011 | Maeda | 398/162 |
| 2012/0063766 | A1 * | 3/2012 | Matsukawa | H04B 10/0793 398/20 |
| 2012/0263452 | A1 | 10/2012 | Shirai | |
| 2013/0071119 | A1 * | 3/2013 | Liu | H04B 10/25137 398/65 |
| 2015/0249501 | A1 * | 9/2015 | Nagarajan | H04B 10/40 398/79 |
| 2015/0372762 | A1 * | 12/2015 | Zhang | H04B 10/5161 398/26 |
| 2016/0112136 | A1 * | 4/2016 | Urban | H04B 10/2504 398/66 |

FOREIGN PATENT DOCUMENTS

| | | |
|---|---|---|
| KR | 10-0387956 B1 | 6/2003 |
| KR | 10-2013-0017025 A | 2/2013 |

\* cited by examiner

RELAY SYSTEM IN RING TOPOLOGY

RELATED APPLICATIONS

This is a continuation of application Ser. No. 14/411,485 filed Dec. 26, 2014, which is a 371 National Stage entry from International Application No. PCT/KR2014/007584 filed Aug. 14, 2014, which claims priority from Korean Patent Application No. 10-2013-0150081, filed on Dec. 4, 2013 in the Korean Intellectual Property Office, the disclosures of which are incorporated by reference herein in their entirety.

TECHNICAL FIELD

The inventive concept relates to a relay system, and more particularly, to an relay system that realizes a ring topology through a master unit and remote units.

BACKGROUND ART

A topology refers to the arrangement or the physical placement of network components of a computer network. As network topologies, there are various topologies such as a cascade topology, a star topology, and a ring topology.

The cascade topology (daisy-chain) has been generally used for relay system. In the cascade topology, when a defect occurs in at least one of remote units, it may be difficult to provide services in all relays serving as lower layers.

In order to solve the problem, there is a method in which when abnormality occurs in a certain remote unit, the remote unit optically passed by providing a passive optic switch in the relay system, or a method in which relays system are configured as a ring topology using redundancy fiber.

Unfortunately, in the method using the passive optic switch, since a separate module is needed, cost may increase. Further, in the ring topology using the redundancy fiber, since photoelectric and electro-optic devices, input/output ports, and redundancy fiber infrastructure are needed twice more than those in the relay according to the related art, cost may increase.

An embodiment of the inventive concept is directed to an optical relay capable of switching Tx/Rx (transmitter/receiver) functions without using redundancy fiber even when a defect occurs in a certain optical relay by being configured as a ring topology.

SUMMARY

According to an aspect of the inventive concept, there is provided a remote unit that is interposed between first and second remote units in a ring topology. The remote unit includes: a first deframer configured to deframe first signals received from the first remote unit; a first framer configured to frame a first transmitting target signal, which is required to be transmitted to the second remote unit, among the first receiving signals; a second deframer configured to deframe second signals received from the second remote unit; a second framer configured to frame a second transmitting target signal, which is required to be transmitted to the first remote unit, among the second receiving signals; a forward DSP section configured to perform digital signal processing on service signals, which are required to be transmitted to a user terminal, among the first receiving signals and the second receiving signals; a reverse DSP section configured to perform digital signal processing on a terminal signal transmitted from the user terminal; and a control section configured to switch between a first switching state in which the first receiving signals and the second receiving signals are respectively used as a forward signal and a reverse signal, and a second switching state in which the first receiving signals and the second receiving signals are respectively used as a reverse signal and a forward signal, in response to a switching control signal.

In an embodiment, the control section is configured to control in the first switching state such that an output signal of the reverse DSP section is summed to a input signal of the second framer, and control in the second switching state such that the output signal of the reverse DSP section is summed to a input signal of the first framer.

In an embodiment, continuous switching control by the control section is performed at an interval corresponding to a predetermined waiting time.

In an embodiment, the control section is configured to control in the first switching state such that remote clock recovery is performed in the first deframer, and control in the second switching state such that the remote clock recovery is performed in the second deframer.

In an embodiment, the remote unit may further include a monitoring section configured to transmit a path-state monitoring control signal or at least one control signal to one of the first and second remote units serving as an upper layer remote unit in the first switching state or the second switching state.

In an embodiment, the control section is configured to perform switching control when a defect is detected in one of the first and second remote units serving as an upper layer remote unit.

In an embodiment, wherein the control section is configured to transmit a switching control signal to other remote units on the other path of one of the first and second remote units serving as an upper layer remote unit.

In an embodiment, the switching control signal is relayed in a daisy chain manner. According to another aspect of the inventive concept, there is provided a master unit configured to manage a plurality of remote units connected in a ring topology. The master unit includes: a network management section configured to transmit at least one of a path-state monitoring control signal and a delay measurement control signal to the plurality of remote units in a first direction and a second direction which is a reverse direction of the first direction, and receives an acknowledgement signal in response to the at least one of a path-state monitoring control signal and a delay measurement control signal; and switching control means for transmitting a forward signal received from a base station in the first direction, and transmitting a switching control signal in the second direction when a defect is detected in any remote unit among the plurality of remote units by the network management section.

In an embodiment, the network management section is configured to transmit a loopback command frame into which a delay measurement pulse is inserted to—any remote unit among the plurality of remote units in the first direction and the second direction.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

According to an embodiment of the inventive concept, it is possible to provide a function of a ring topology without adding separate infrastructure or a separate module, compared to the related art in which services are continuously provided by using a bypass path through redundancy fiber or bypassing a signal through a passive optic switch when a defect occurs in a certain remote unit.

BRIEF DESCRIPTION OF THE DRAWINGS

A brief description of each drawing is provided to more sufficiently understand the drawings referred to in the detailed description of the inventive concept, in which.

DETAILED DESCRIPTION OF THE EMBODIMENTS

Embodiments of the inventive concept will be described below in detail with reference to the accompanying drawings. Throughout the drawings, like reference numerals refer to like parts, and, thus, redundant description thereof will not be presented.

The embodiments of the inventive concept are provided to more completely explain the inventive concept to those having ordinary skill in the art. The following embodiments may be modified in various forms, and the scope of the inventive concept is not limited by the following embodiments. Rather, these embodiments are provided so that this disclosure will be thorough and complete, and will fully convey the spirit of the inventive concept to those skilled in the art.

In describing the embodiments of the inventive concept, the detailed description of known relevant functions or constructions that may unnecessarily obscure the gist of the inventive concept will not be presented. Furthermore, numbers (for example, first, second, etc.) used to describe the present specification are merely used to distinguish one element from another. It will be understood in the present specification that when it is described that one element is "coupled" or "connected" to another element, the one element may be directly coupled or connected to the another element, or the one element may be coupled to connected to the another element with the other element interposed therebetween unless the context clearly indicates otherwise.

The terminologies used in the present specification are used to appropriately express the embodiments of the inventive concept, and the terminologies may be variable depending on intention of a user or an operator, or practices in the art to which the inventive concept belongs. Therefore, the terminologies should be defined based on the whole context throughout the present specification. Throughout the drawings, like reference numerals refer to like parts.

Figure 1:
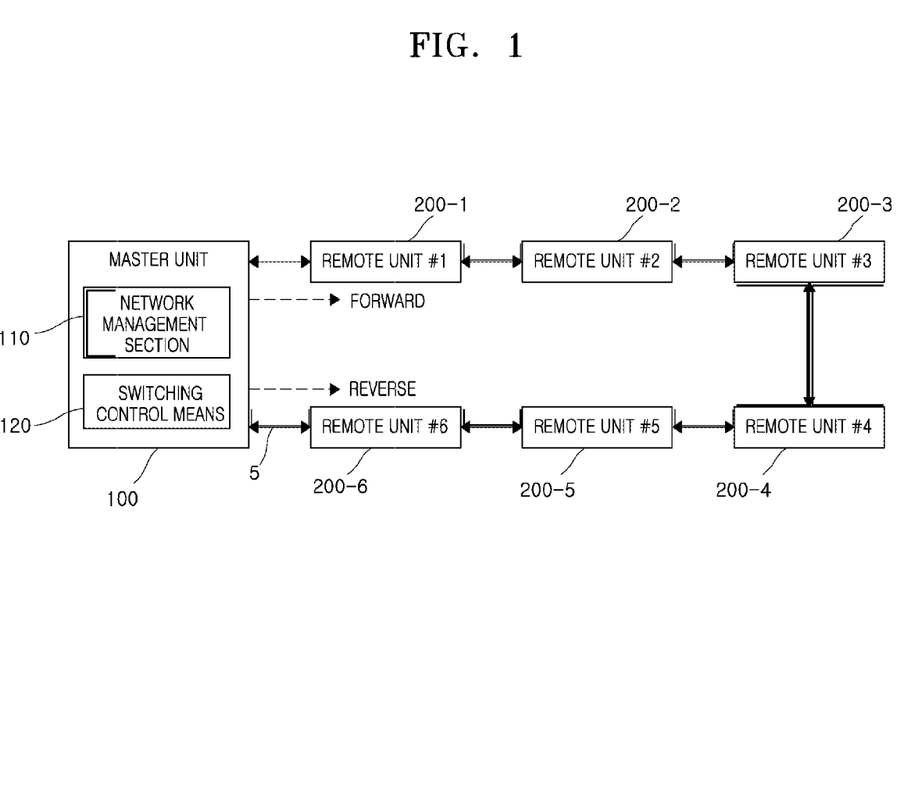
FIG. 1 is a block diagram illustrating a relay system topology according to an embodiment of the inventive concept.
Figure 2:
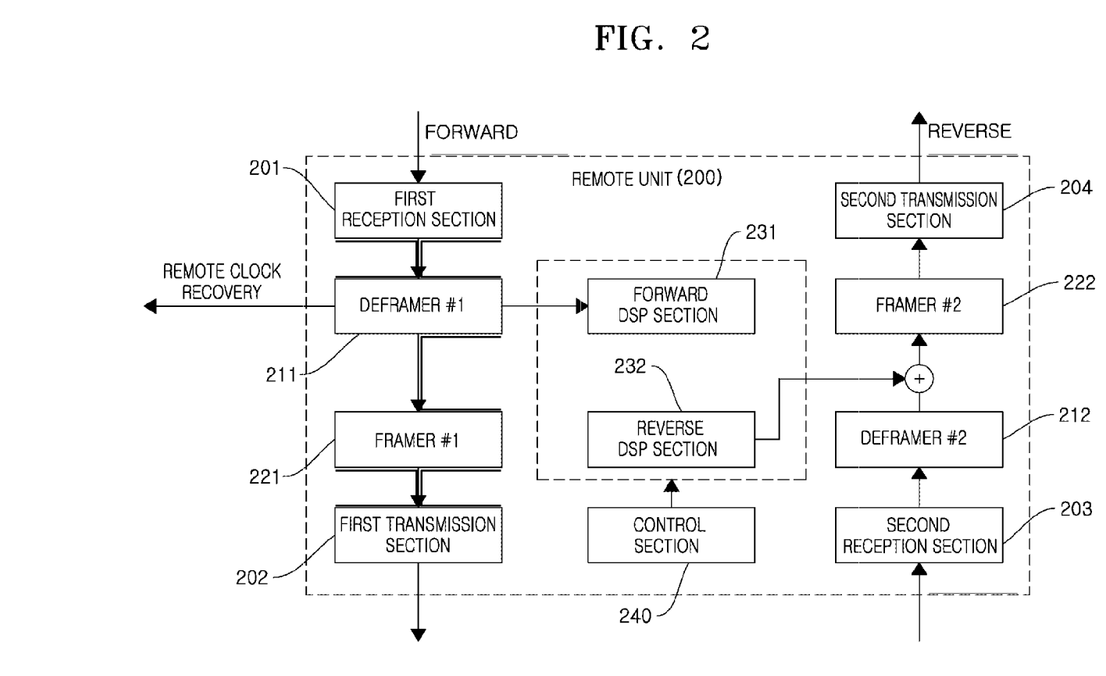
FIG. 2 is a block diagram showing a remote unit according to the embodiment of the inventive concept.
Figure 3:
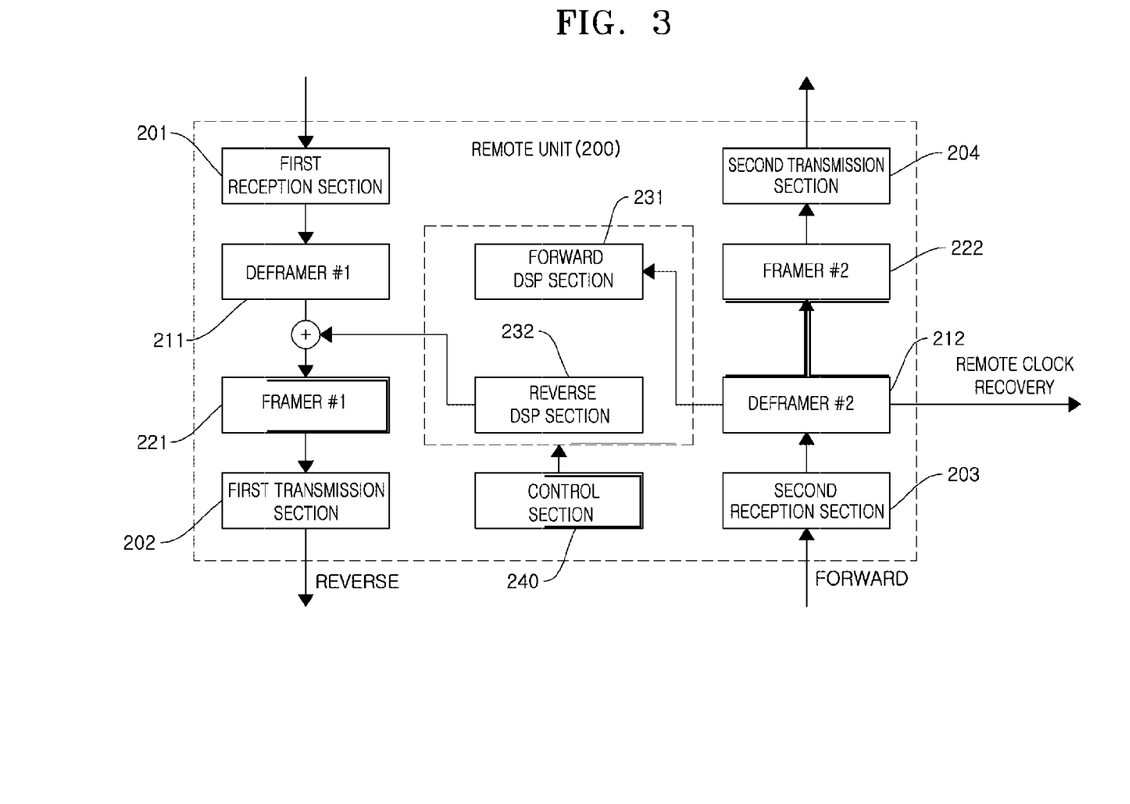
FIG. 3 is a schematic block diagram showing a state where the remote unit according to the embodiment of the inventive concept operates in a switching state.

A relay system topology according to an embodiment of the inventive concept and a master unit and remote units included in the relay system topology will be described with reference to FIGS. 1 to 3. FIG. 1 is a block diagram illustrating the relay system topology according to the embodiment of the inventive concept, FIG. 2 is a block diagram illustrating the remote unit according to the embodiment of the inventive concept, and FIG. 3 is a schematic block diagram illustrating a state where the remote unit according to the embodiment of the inventive concept operates in a switching state.

A relay system according to the present embodiment is configured as a ring topology. That is, a plurality of remote units 200 is connected to a master unit 100 that communicates with a base station in a ring shape.

The mater unit 100 is equipment connected to the base station, and is connected to the plurality of remote units 200 serving as its lower layers through optical fibers 5. In order to transmit a base-station forward signal to a user terminal, the master unit 100 transmits the forward signal to the remote unit 200 connected to the user terminal which is a destination of the forward signal. The master unit 100 receives a reverse signal transmitted from the user terminal from the remote unit to sum the received reverse signal and a signal for each of branches, and transmits the summed signal to the base station.

The remote unit 200 is connected to the master unit 100 serving as its upper layer or other remote units 200 through the optical fiber 5. The remote unit 200 receives the base-station forward signal from the master unit 100, and transmits the received forward signal to the remote unit 200 serving as its lower layer. Alternatively, when the forward signal is received from the user terminal connected to the corresponding remote unit, the remote unit performs signal processing on the received forward signal, and transmits and provides the processed signal to the user terminal. The remote unit 200 performs signal processing on a terminal signal received from the user terminal to sum the processed signal and a signal received from the remote unit 200 serving as its lower layer, and transmits the summed signal to the master unit 100.

The optical fiber 5 is a data transmission path provided between the master unit 100 and the remote unit 200 or between the remote units 200. Each of the units performs photoelectric conversion or electro-optic conversion on information, and receives or transmits the converted information, and data is transmitted in the form of frame. For example, electro-optic conversion is performed on a serial signal framed in the master unit 100, and the converted serial signal is transmitted through the optical fiber.

Specifically, the master unit 100 includes a network management section 110, and switching control means 120.

The network management section 110 transmits control signals in a forward direction in which the forward signal is transmitted and a reverse direction thereof. For example, the network management section 110 may transmit a path-state monitoring control signal and a delay measurement control signal. The network management section 110 receives ACK (acknowledgement) signals in response to the control signals such as the path-state monitoring control signal and the delay measurement control signal.

The network management section 110 may transmit a loopback command frame into which a delay measurement pulse is inserted to a certain relay unit in the both directions as described above. Since OFDM-based signals are provided from all the remote units at the same time in order to allow carriers to be orthogonal to each other, it is necessary to measure a delay in optical fiber. Further, in order to minimize a recovery time at a switching timing due to a defect occurring in a certain remote unit, it is necessary to measure a delay in the both directions.

A method of measuring a delay is performed by measuring a time taken for the master unit to receive a loopback command in which a delay measurement pulse is inserted into a certain field of a frame after transmitting a loopback command to a remote unit to be desired to measure a delay. In this case, other remote units 200 bypass the delay measurement pulse to allow the delay measurement pulse to be looped back by the certain remote unit to be measured. Meanwhile, reception photo diode (PD) power, a loss of signal (LOS), and a loss of frame may be used as information that determines a switching timing.

The switching control means 120 transmits the forward signal initially transmitted from the base station in a certain direction on the basis of the initial setting value. When defect of the certain remote unit among the plurality of remote units 200 is detected by the network management section 110, the switching control means transmits a switching control signal in a reverse direction of the initially set direction, and transmits the forward signal transmitted from the base station.

As illustrated in FIG. 2, a first deframer 211 of the remote unit 200 serves as a forward deframer that receives the forward signals received through a first reception section 201 to deframe the received forward signals in an initializing stage.

The forward deframer serves as a frame deframer that performs functions such as photoelectric conversion, a serial-to-parallel converter, and data alignment.

In an initial state, a first framer 221 serves as a forward framer. The forward framer performs framing, parallel-to-serial conversion, and electro-optic conversion on data in order to transmit data received from the upper layer to the remote unit serving as its lower layer.

A forward DSP section 231 performs digital signal processing on a service signal, which is required to be transmitted to the user terminal, among the forward signals. The forward DSP section 231 is, for example, a DSP processor, and performs forward digital signal processing. That is, in order to provide the forward signal received from the master unit or the remote unit serving as its upper layer to the user terminal, the forward DSP section performs signal processing such as filtering on the forward signal.

A second deframer 212 deframes signals received from other remote units through a second reception section 203, and initially serves as a reverse deframer. The reverse deframer performs an operation for transmitting a reverse signal received from the remote unit serving as its lower layer to the upper layer, and has the same function as that in the forward deframer.

A second framer 222 frames a transmitting target signal, which is required to be transmitted (delivered) to another remote unit, among the signals transmitted from the second deframer 212. The second framer 222 services as a reverse framer in an initial stage. The reverse framer performs an operation in which a signal obtained by performing digital signal processing by a reverse DSP section 232 and a signal obtained by deframing the signal received from the remote unit serving as its lower layer by the reverse deframer are summed and the summed signal is transmitted to the master unit or the remote unit serving as its upper layer. The reverse framer has the same function as that in the aforementioned forward framer.

The reverse DSP section 232 performs digital signal processing on the reverse signal transmitted from the user terminal. For example, the reverse DSP section 232 is a processor that performs processing (reverse digital signal processing) on a digital signal, and performs signal processing such as filtering on the terminal signal received from the user terminal to transmit the processed terminal signal to the master unit or the remote unit serving as its upper layer.

In the initial stage, the forward DSP section 231 receives the forward signal from the first deframer 211 to perform signal processing on the forward signal, and transmits the processed forward signal to the user terminal. The signal transmitted from the reverse DSP section 232 and the deframed signal in the second deframer 212 are summed to be input to the second framer 222.

A control section 240 switches between switching states in response to the control signal of the master unit or the remote unit serving as its upper layer. The remote unit 200 according to the present embodiment includes two switching states of a first switching state and a second switching state. Specifically, in the first switching state, the first deframer 211 receives the forward signal to transmit a certain signal to the forward DSP section 231, and sums the reverse signal received by the second deframer 212 and the reverse signal from the reverse DSP section 232 to transmit the summed signal to the second framer 222. On the contrary, in the second switching state, as illustrated in FIG. 3, the second deframer 212 receives the forward signal to transmit a certain signal to the forward DSP section 231, and sums the reverse signal received by the first deframer 212 and the reverse signal from the reverse DSP section 232 to transmit the summed signal to the first framer 221. As described above, transmission directions of the forward signal and the reverse signal are changed depending on the switching states.

Meanwhile, continuous switching control by the control section 240 may be performed at an interval corresponding to a predetermined waiting time. When defects occur in the both directions, switching is asynchronously performed at the remote unit. For this reason, in order to correctly receive return information through a network management system (NMS), a certain waiting time needs to be between switching cycles.

The control section 240 may control in the first switching state such that remote clock recovery is performed by the first deframer 211 as depicted in FIG. 2, and may control in the second switching state such that remote clock recovery is performed by the second deframer 212, as depicted in FIG. 3.

The remote clock recovery is used to synchronize clocks of the master unit and the corresponding remote unit. Since the master unit and the remote unit are physically separated, it is necessary to synchronize the clocks of the units. Such remote clock recovery may be performed through a phase-locked loop system after a data boundary of a stream in optical fiber is detected to extract a clock component. When the path switching is performed, since a point to be connected to the upper layer is changed, a target on which the clock recovery is performed needs to be changed depending on the switching of the path.

Meanwhile, when necessary, the remote unit 200 according to the present embodiment may include an upper-remote-unit monitoring section (not shown) that transmits the path-state monitoring control signal or at least any one control signal of the control signals to an upper remote unit in the first switching state or the second switching state. In this case, the remote units 200 are configured such that the upper remote units and the lower remote units control and monitor each other in a point-to-point connection and defect information is transmitted to the master unit via the upper remote units when the defect is detected in the certain remote unit. In this case, the control section 240 transmits the switching control signal to other remote units of the upper remote unit from which the defect has been detected, that is, the lower remote units, and here, the switching control signal may be relayed in a daisy chain manner.

Figure 4:
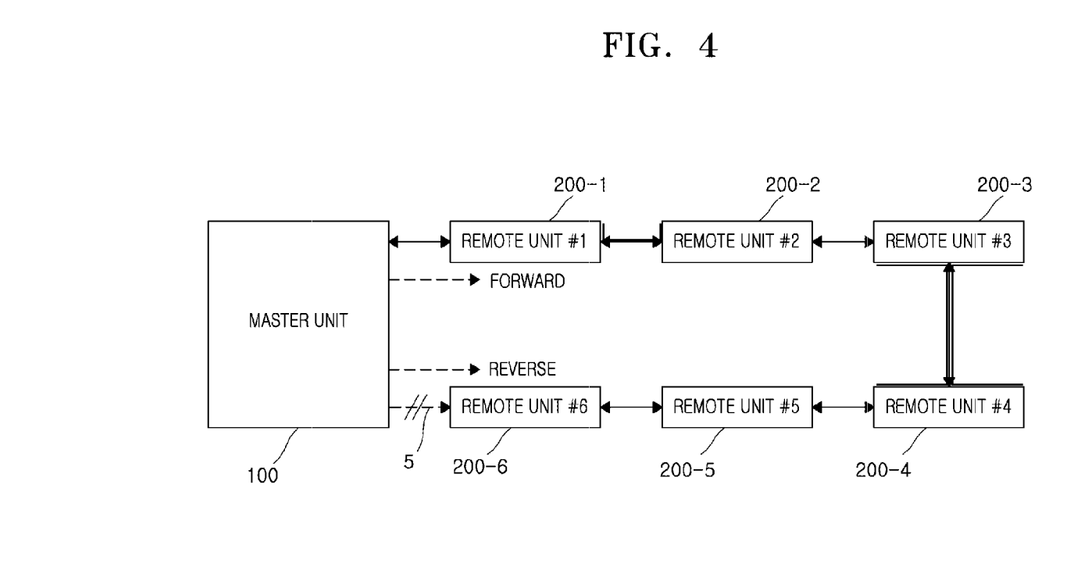
FIG. 4 is a schematic block diagram illustrating the relay system topology according to the embodiment of the inventive concept when a transmission problem occurs in a forward direction.

A control process according to the embodiment of the inventive concept when a defect occurs in a partial component constituting a ring topology will be now described with reference to FIG. 4. FIG. 4 is a schematic block diagram illustrating a relay system topology according to the embodiment of the inventive concept when a defect occurs in a partial component.

When a system is driven, a default path is selected based on the initial setting value as illustrated in FIG. 4. The master unit 100 sends the control signal in both of Tx and Rx directions, and the remote unit 200 performs an operation in response to the control signal received through the selected path. As described above, the master unit 100 monitors both of the forward and reverse directions, performs delay measurement in the both directions at the same time, and obtains only a result measured for the selected path.

The master unit 100 monitors a state of the path through the network management section 110, and reports abnormality to the network management system (NMS) (not shown) which is an upper layer when the abnormality occurs in the path. That is, the master unit 100 (more specifically, the network management section 110) reports the monitored result for the path to the upper NMS in connection with the NMS, so that the NMS can check whether or not the path is normal. Subsequently, information on occurrence of the abnormality in the path is relayed (in the daisy chain manner) between the remote units, so that it is possible to perform the path switching at the remote unit 200.

For example, when a defect occurs in the optical fiber of the remote unit 200-6 which is a final stage in the forward direction as shown in FIG. 4, the remote unit 200-6 may perform the path switching. In this case, when a switching signal is transmitted by the master unit 100, the switching is sequentially performed from the first remote unit 200-1 to the final remote unit 200-6. In contrast, when the switching signal is transmitted from the final remote unit 200-6, the switching is sequentially performed from the final remote unit 200-6 to the first remote unit 200-1.

As mentioned above, when the defect occurs in the partial component to perform the switching, it is possible to maintain a function of an optical communication network of a single cascade topology.

After the switching, the process of monitoring the path state or measuring the delay is similarly performed. When a defect occurs even in the switched direction, since the preceding defect is likely to be recovered through maintenance until the current defect occurs, the same process is performed.

Figure 5:
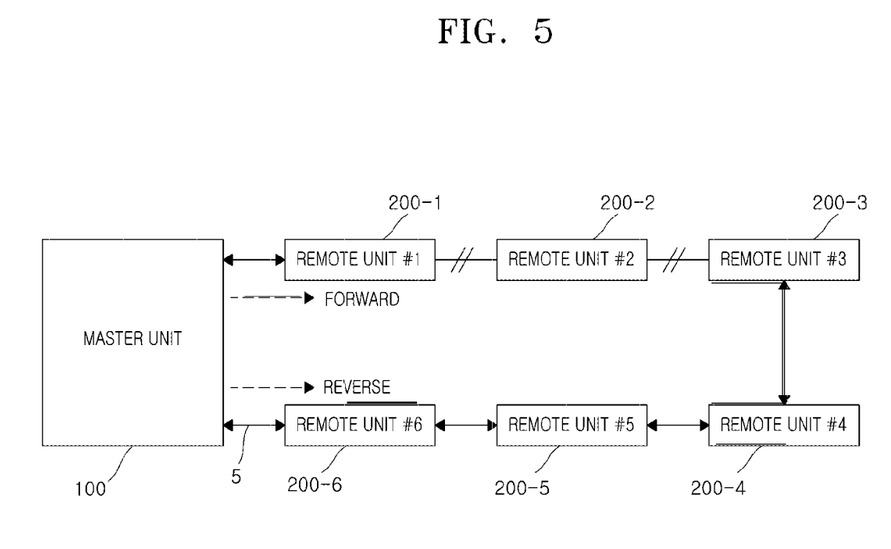
FIG. 5 is a schematic block diagram illustrating the relay system topology according to the embodiment of the inventive concept when a transmission problem occurs in both of forward and reverse directions.

A switching process when another type of defect occurs will be described with reference to FIG. 5. FIG. 5 is a schematic block diagram illustrating a relay system topology according to the embodiment of the inventive concept when a transmission problem occurs in both of the forward and reverse directions.

FIG. 5 shows a case where a defect occurs in, for example, the second remote unit 200-2 in the forward direction. In this case, when the monitoring and switching process according to the present embodiment described above applies, the same transmission path as that in the related art is set up to the first remote unit 200-1, but the optical relay topology is configured as not the ring topology but the cascade topology.

The switching is performed from the final remote unit 200-6 in the forward direction to the remote unit 200-3 which is a fourth stage in the reverse direction to serve as an optical communication network of another cascade topology.

While the inventive concept has been described with respect to the specific embodiments, it will be apparent to those skilled in the art that various changes and modifications may be made without departing from the spirit and scope of the invention as defined in the following claims.

What is claimed is:

1. A unit of digital radio frequency transport system, comprising:
   a first transport processing path configured to digitally process a first signal received from a first adjacent unit through a first transmission medium and transmit the first signal to a second adjacent unit through a second transmission medium while operating in a first mode, and digitally process a second signal received from the second adjacent unit through the second transmission medium and transmit the second signal to the first adjacent unit through the first transmission medium while operating in a second mode;
   a second transport processing path configured to digitally process the second signal received from the second adjacent unit through the second transmission medium and transmit the second signal to the first adjacent unit through the first transmission medium while operating in the first mode, and digitally process the first signal received from the first adjacent unit through the first transmission medium and transmit the first signal to the second adjacent unit through the second transmission medium while operating in the second mode; and
   a controller configured to switch between the first mode and the second mode for each of the first transport processing path and the second transport processing path based on a mode control signal,
   wherein the first transport processing path comprises:
   a de-framer configured to de-frame the first signal while operating in the first mode and de-frame the second signal while operating the second mode; and
   a framer configured to frame the de-framed first signal while operating in the first mode and frame a signal, which is generated by summing the de-framed second signal and a digital processed terminal signal, while operating in the second mode.

2. The unit of claim 1, wherein the first transport processing path further comprise:
   a transmitter configured to transmit the framed first signal to the second adjacent unit through the second transmission medium while operating in the first mode and transmit the framed signal to the first adjacent unit through the first transmission medium while operating in the second mode.

3. The unit of claim 1, wherein the first transport processing path comprises:
   a first receiver configured to receive the first signal and perform a clock recovery based on the first signal while operating in the first mode, and receive the second signal while operating in the second mode.

4. The unit of claim 1, wherein the second transport processing path comprises:
   a de-framer configured to de-frame the second signal while operating in the first mode, and de-frame the first signal while operating in the second mode; and
   a framer configured to frame a signal, which is generated by summing the de-framed second signal and a digital processed terminal signal, while operating in the first mode, and frame the de-framed first signal while operating in the second mode.

5. The unit of claim 4, wherein the second transport processing path further comprise:
   a transmitter configured to transmit the framed signal to the first adjacent unit through the first transmission medium while operating in the first mode, and transmit the framed first signal to the second adjacent unit through the second transmission medium while operating in the second mode.

6. The unit of claim 1, wherein the second transport processing path comprises:
   a second receiver configured to receive the second signal while operating in the first mode, and receive the first signal and perform a clock recovery based on the first signal while operating in the second mode.

7. The unit of claim 1, further comprising:
   a first processor configured to receive a de-framed first signal from the first transport processing path while operating in the first mode, receive another de-framed first signal from the second transport processing path while operating in the second mode, and perform digital processing on the de-framed first signal and the other de-framed first signal; and
   a second processor configured to perform digital processing on a terminal signal to generate a digital processed terminal signal, transmit the digital processed terminal signal to the second transport processing path while operating in the first mode, and transmit the digital processed terminal signal to the first transport processing path while operating in the second mode.

8. The unit of claim 1, wherein the controller receives the mode control signal from the first adjacent unit or the second adjacent unit through one of the first transport processing path and the second transport processing path.

9. The unit of claim 1, wherein the controller generates the mode control signal based on path monitoring information, wherein the path monitoring information is associated with the at least one of the first transport processing path and the second transport processing path.

10. The unit of claim 1, wherein the controller generates the mode control signal based on path monitoring information, wherein the path monitoring is transmitted from the first adjacent unit or the second adjacent unit.

11. The unit of claim 1, wherein the controller, after switching from the first mode to the second mode, switches from the second mode to the first mode at an interval of a time corresponding to a time of control by a network management server or a master unit.

12. The unit of claim 1, wherein the unit is a first remote unit, and the first adjacent unit is a master unit or a second remote unit, which are communicatively coupled to the first remote unit, and the second adjacent unit is a third remote unit communicatively coupled to the first remote unit.

13. A unit of digital radio frequency transport system, comprising:
   a first processor configured to receive a de-framed first signal from a first transport processing path while operating in a first mode, receive another de-framed first signal from a second transport processing path while operating in a second mode, and perform digital processing on a service signal in the de-framed first signal and the other de-framed first signal, wherein the service signal is transmitted to a user terminal;
   a second processor configured to perform digital processing on a terminal signal transmitted from the user terminal, transmit the digital processed terminal signal to the second transport processing path while operating in the first mode, and transmit the digital processed terminal signal to the first transport processing path while operating in the second mode; and
   a controller configured to switch between the first mode and the second mode for each of the first processor and the second processor based on a mode control signal,
   wherein the de-framed first signal is a signal generated by the first transport processing path de-framing a first signal transmitted from a first adjacent unit through a first transmission medium, and the other de-framed first signal is generated by the second transport processing path de-framing the first signal transmitted from the first adjacent unit through the first transmission medium, and
   wherein the first transport processing path comprises:
      a de-framer configured to de-frame the first signal transmitted from the first adjacent unit through the first transmission medium, transmit the de-framed first signal to the first processor while operating in the first mode, and de-frame a second signal transmitted from a second adjacent unit through a second transmission medium while operating in the second mode; and
      a framer configured to frame the de-framed first signal while operating in the first mode, and frame a signal, which is generated by summing the de-framed second signal and the digital processed terminal signal transmitted from the second processor, while operating in the second mode.

14. The unit of claim 13, wherein the second transport processing path comprises:
   a de-framer configured to de-frame a second signal transmitted from the second adjacent unit through the second transmission medium while operating in the first mode, de-frame the first signal transmitted from the first adjacent unit through the first transmission medium, and transmit the other de-framed first signal to the first processor while operating in the second mode; and
   a framer configured to frame a signal, which is generated by summing the de-framed second signal and the digital processed terminal signal transmitted from the second processor, while operating in the first mode, and frame the de-framed first signal while operating in the second mode.

* * * * *